Jan. 14, 1930.  A. L. SCHOFF ET AL  1,743,688
CUSHION TIRE STRUCTURE
Filed July 1, 1926
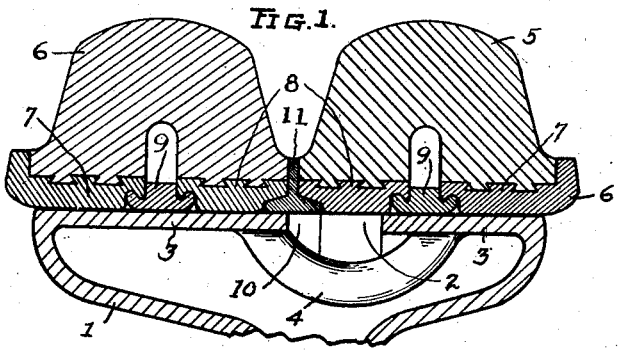
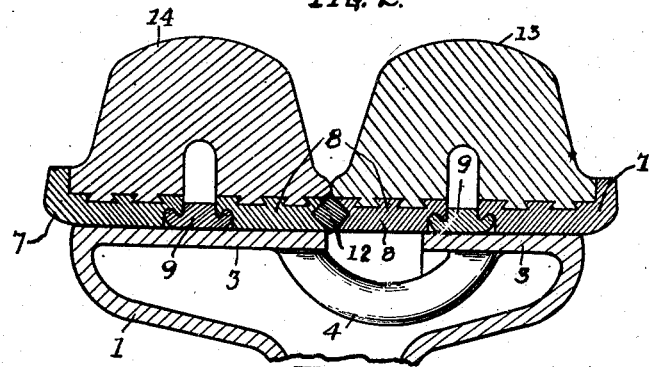
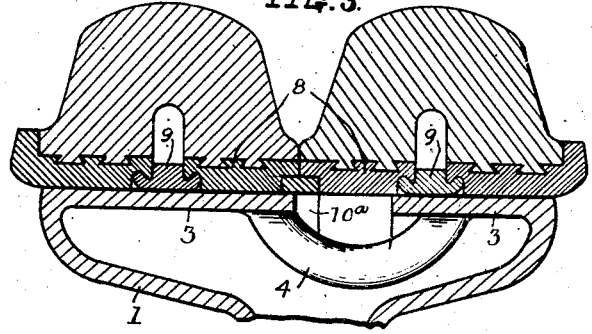
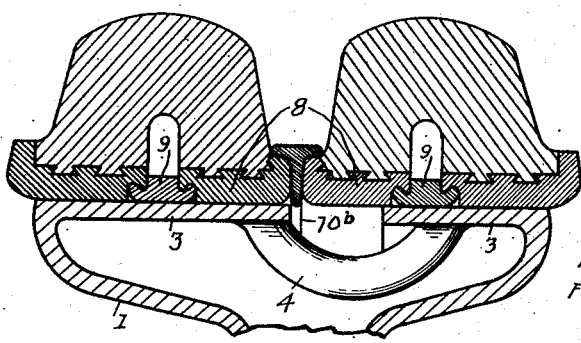
INVENTOR
A. L. SCHOFF,
FRANK H. MEYER.
Evans & McCoy
ATTORNEYS Patented Jan. 14, 1930

1,743,688

UNITED STATES PATENT OFFICE

ALBERT L. SCHOFF, OF CALDWELL, NEW JERSEY, AND FRANK H. MEYER, OF WARREN, OHIO; SAID MEYER ASSIGNOR TO THE AMERICAN WELDING & MANUFACTURING CO., OF WARREN, OHIO, A CORPORATION OF OHIO, AND SAID SCHOFF ASSIGNOR TO OVERMAN CUSHION TIRE COMPANY, INC., OF NEW YORK, N. Y., A CORPORATION OF NEW YORK

CUSHION-TIRE STRUCTURE

Application filed July 1, 1926. Serial No. 119,852.

This invention relates to cushion tire structures and particularly to means for more adequately supporting the base portions of pressed on cushion tires mounted in dual relation on vehicle wheels having a partially open tire seating face.

One object of the invention is to mutually support the adjacent base portions of cushion tires mounted in dual relation from an interposed supporting ring.

It is also an object of the invention to provide means for joining the adjacent portions of a pair of juxtaposed cushion tire bases.

Another object of the invention is to provide a support of the character specified that can be conveniently used with cushion tires of conventional form of base band without changing the form of the base.

Other objects and advantages of the invention will be apparent from a study of the accompanying drawing wherein:

Figure 1 is a transverse sectional view of the tire and wheel assembly, with parts broken away, illustrating an application of our invention.

Fig. 2 is a corresponding transverse sectional view of a modified form of the invention.

Fig. 3 is a transverse sectional view of a rim and wheel assembly illustrating a different application of the invention; and Fig. 4 is a corresponding transverse sectional view, of a tire and wheel assembly, illustrating an application of the invention wherein the base sections of the cushion tire structure require no modification from the conventional form of base used for independently mounted cushion tires.

In the casting of metal wheels, such for instance as the wheel body shown in the various figures of the drawings, it is sometimes necessary to provide an annular aperture in the tire mounting face of the rim for the purpose of removing the core sections that are used in forming the wheel.

The cushion tires that are used with wheel structures of this character, generally have their bases formed of a pair of spaced annular bands that are connected by a spacer ring. When cushion tires of this character are mounted side by side on a wheel of the above type, it is often found that a major portion of one of the annular base band elements of one of the cushion tires overhangs the aperture formed in the seating face of the wheel. The absence of adequate support for one of the base elements of one of the tires causes damage to both tires on the wheel because of the uneven load on the one tire and the overload on the other. The present invention provides an adequate support for both of the base elements of each cushion tire mounted on a wheel of the above character.

Figure 1 of the accompanying drawing shows a conventional form of cast metal wheel 1 that has an annular aperture 2 formed in the tire seating face 3 of the wheel. The aperture is provided for the convenient removal of core sections from the wheel body during the manufacture of the wheel. A reenforcing rib 4 extends across the interior of the wheel between the tire seating faces of the wheel rim. Cushion tires 5 and 6 each of which has a chambered body portion that is permanently vulcanized to annular rim sections 7 and 8 that are spaced by an interlocking ring 9, are mounted in dual relation on the seating face 3 of the wheel.

The base members 8 each have a groove formed in their adjacent edge portions for receiving an annular supporting ring 10. The inner face of the ring 10 is of substantially the same internal diameter as the inner faces of the base members 8. The base flange of the supporting ring is slightly tapered toward its edges and is provided with an annular radial flange 11 that serves to slightly space the tires 5 and 6 and to greatly strengthen the ring 10. Each base element 8 has an inclined seating face that engages the corresponding seating face of the ring 10.

The ring 10, which may be endless, supports the outer edge of the tire base element 8 that overhangs the aperture 2 of the wheel body. The other edge of the overhanging base element is adequately supported by the base 3 of the wheel.

Fig. 2 shows a form of supporting ring 12 that is held in place between the pressed on cushion tires 13 and 14. Each of these tires has a groove in the lateral face of the base band that is adapted to receive portions of the supporting ring 12. The supporting ring here proposed serves to support the overhanging base element of one tire from the base element of the other.

In Fig. 3 a construction is shown in which an endless annular ring 10ª of substantially rectangular cross sectional form serves to support the overhanging portion of the tire base from the adjacent rim base and seating face of the wheel.

The supporting ring 10ᵇ shown in Fig. 4 is arranged to be used with standard forms of cushion tire structures without modification of the side flanged portions of the tire base. This ring is endless and substantially of T-shape in cross section. The two arms of the T overhang the adjacent edge portions of the tire bases. This is a very convenient application of the invention.

Although only a few applications of the invention have been described, other applications thereof will be obvious to those skilled in the art. We desire, therefore, that only such limitations shall be imposed as are set forth in the accompanying claims, it being our intention to claim the invention as broadly as the art will permit.

What we claim is:

1. The combination with a wheel having a pair of laterally spaced tire seating faces formed on the periphery thereof with an aperture therebetween, of a tire having its base seated on one of the seating faces, another tire having its base seated on the other seating face with the inner side portion of the base overhanging said aperture, and an unattached supporting ring interposed between the inner edges of the bases and held against lateral movement thereby, the said ring having portions in overlapping engagement with adjacent edge portions of the bases and serving to support the overhanging portion of the base of the second tire from the base of the first tire.

2. The combination with a wheel having a pair of laterally spaced circumferential tire seating faces formed thereon, of a pair of cushion tires, each having a base mounted on one of said seating faces, one of the tire bases having its inner side portion overhanging the aperture between the seating faces of the wheel, and an endless ring of substantially T-shape cross section having its web clamped between the tire bases and its flanges overlying inner edge portions of the tire bases to rigidly hold the inner edge portions of the tire bases against relative radial movement.

In testimony whereof we affix our signatures.

ALBERT L. SCHOFF.
FRANK H. MEYER.